United States Patent
Sewall et al.

(10) Patent No.: US 9,232,461 B2
(45) Date of Patent: Jan. 5, 2016

(54) HOTSPOT COMMUNICATION LIMITER

(75) Inventors: Pat Sewall, Boise, ID (US); Dave Johnson, Boise, ID (US)

(73) Assignee: Cradlepoint, Inc., Boise, ID (US)

( * ) Notice: Subject to any disclaimer, the term of this patent is extended or adjusted under 35 U.S.C. 154(b) by 347 days.

(21) Appl. No.: 11/673,956

(22) Filed: Feb. 12, 2007

(65) Prior Publication Data

US 2008/0039102 A1     Feb. 14, 2008

Related U.S. Application Data

(63) Continuation-in-part of application No. 10/936,124, filed on Sep. 8, 2004, now Pat. No. 7,764,784.

(60) Provisional application No. 60/772,777, filed on Feb. 13, 2006.

(51) Int. Cl.
*H04W 40/02* (2009.01)
*H04W 12/08* (2009.01)
*H04W 48/02* (2009.01)
*H04L 12/28* (2006.01)
*H04W 4/00* (2009.01)
*H04L 29/06* (2006.01)

(52) U.S. Cl.
CPC ............ *H04W 48/02* (2013.01); *H04L 12/2856* (2013.01); *H04W 4/003* (2013.01); *H04L 63/102* (2013.01); *H04W 12/08* (2013.01)

(58) Field of Classification Search
CPC .............. H04L 29/12066; H04L 69/40; H04L 61/1511; H04L 12/2856; H04L 63/102; H04W 48/02; H04W 4/003; H04W 12/08; H04W 16/16; H04W 4/06; H04W 4/16; H04M 2250/62; H04B 3/36

USPC ................. 455/410, 411, 414.1–414.4, 445; 709/229, 225, 226; 370/438, 439; 713/153–154; 726/2–15, 26–30
See application file for complete search history.

(56) References Cited

U.S. PATENT DOCUMENTS 5,231,633 A    7/1993   Hluchyj et al.
5,594,946 A    1/1997   Menich et al.
(Continued)

FOREIGN PATENT DOCUMENTS

| EP | 1331784 A1 | 7/2003 |
|---|---|---|
| JP | 20010186565 | 7/2001 |
| KR | 20040028099 | 4/2004 |

OTHER PUBLICATIONS

International Search Report & Written Opinion of the International Searching Authority for Application No. PCT/US07/62079, mailed Nov. 8, 2007.

(Continued)

*Primary Examiner* — Khawar Iqbal
(74) *Attorney, Agent, or Firm* — Parsons Behle & Latimer

(57) ABSTRACT

An embodiment is directed to a method for limiting network communications. The method is implemented at a device through which communications can be routed between client devices and the internet. The method includes receiving a routable communication. A communication type for the routable communication is identified. The communication type may be owner, authorized, or anonymous. Access rules for the identified communication type are identified. The routing of the communication is limited according to the identified access rules.

41 Claims, 7 Drawing Sheets

(56) References Cited

U.S. PATENT DOCUMENTS

| | | | |
|---|---|---|---|
| 5,638,359 | A | 6/1997 | Peltola et al. |
| 5,859,628 | A | 1/1999 | Ross et al. |
| 5,864,539 | A | 1/1999 | Yin |
| 6,006,034 | A | 12/1999 | Heath et al. |
| 6,006,264 | A | 12/1999 | Colby et al. |
| 6,028,848 | A | 2/2000 | Bhatia et al. |
| 6,031,844 | A | 2/2000 | Lin |
| 6,377,825 | B1 | 4/2002 | Kennedy et al. |
| 6,389,462 | B1 | 5/2002 | Cohen et al. |
| 6,434,187 | B1 | 8/2002 | Beard et al. |
| 6,535,592 | B1 | 3/2003 | Snelgrove |
| 6,553,028 | B1 | 4/2003 | Tang |
| 6,560,442 | B1 | 5/2003 | Yost et al. |
| 6,609,197 | B1 | 8/2003 | Ketcham et al. |
| 6,611,861 | B1 | 8/2003 | Schairer et al. |
| 6,615,262 | B2 | 9/2003 | Schweitzer et al. |
| 6,735,447 | B1 | 5/2004 | Muller |
| 6,795,700 | B2 * | 9/2004 | Karaoguz et al. ............ 455/408 |
| 6,850,495 | B1 * | 2/2005 | Baum et al. .................. 370/256 |
| 6,862,444 | B2 | 3/2005 | Karaoguz et al. |
| 6,885,859 | B2 | 4/2005 | Karaoguz et al. |
| 6,967,958 | B2 | 11/2005 | Ono et al. |
| 6,987,726 | B1 | 1/2006 | Elliott |
| 7,009,941 | B1 | 3/2006 | Uchino |
| 7,095,335 | B2 | 8/2006 | De Bolster et al. |
| 7,146,180 | B1 * | 12/2006 | Liu .................. H04M 1/72502 455/426.1 |
| 7,187,923 | B2 | 3/2007 | Mousseau et al. |
| 7,213,478 | B2 | 5/2007 | Harada et al. |
| 7,317,896 | B1 | 1/2008 | Saxena et al. |
| 7,346,344 | B2 | 3/2008 | Fontaine |
| 7,382,771 | B2 | 6/2008 | Leblanc et al. |
| 7,400,903 | B2 | 7/2008 | Shoemake et al. |
| 7,421,265 | B1 | 9/2008 | Liu |
| 7,558,199 | B1 | 7/2009 | Minei |
| 7,617,317 | B2 | 11/2009 | Jones et al. |
| 7,620,065 | B2 | 11/2009 | Falardeau |
| 7,675,862 | B2 | 3/2010 | Pham et al. |
| 7,764,784 | B2 | 7/2010 | Sewall |
| 7,813,314 | B2 | 10/2010 | Fulknier et al. |
| 8,046,000 | B2 | 10/2011 | Sylvain |
| 8,077,681 | B2 | 12/2011 | Ahmavaara |
| 8,090,807 | B2 | 1/2012 | Chung et al. |
| 8,126,145 | B1 | 2/2012 | Tewari et al. |
| 2001/0039580 | A1 | 11/2001 | Walker et al. |
| 2001/0042215 | A1 * | 11/2001 | Sullivan et al. ............... 713/201 |
| 2001/0046870 | A1 | 11/2001 | Stilp et al. |
| 2001/0048683 | A1 | 12/2001 | Allen |
| 2002/0025832 | A1 | 2/2002 | Durian et al. |
| 2002/0062372 | A1 | 5/2002 | Hong et al. |
| 2002/0118663 | A1 | 8/2002 | Dorenbosch et al. |
| 2003/0037165 | A1 | 2/2003 | Shinomiya |
| 2003/0043755 | A1 | 3/2003 | Mitchell |
| 2003/0045295 | A1 | 3/2003 | Stanforth |
| 2003/0046396 | A1 | 3/2003 | Richter et al. |
| 2003/0059005 | A1 | 3/2003 | Meyerson et al. |
| 2003/0126252 | A1 | 7/2003 | Abir |
| 2003/0157929 | A1 * | 8/2003 | Janssen .................. H04M 1/725 455/416 |
| 2003/0200308 | A1 | 10/2003 | Tameda et al. |
| 2003/0212800 | A1 | 11/2003 | Jones et al. |
| 2003/0235175 | A1 * | 12/2003 | Naghian et al. ............... 370/338 |
| 2004/0003071 | A1 * | 1/2004 | Mathew et al. ............... 709/223 |
| 2004/0038697 | A1 | 2/2004 | Attar et al. |
| 2004/0049576 | A1 | 3/2004 | Schweitzer et al. |
| 2004/0068502 | A1 | 4/2004 | Vogedes |
| 2004/0087304 | A1 * | 5/2004 | Buddhikot .......... H04L 12/2856 455/426.2 |
| 2004/0110544 | A1 | 6/2004 | Oyagi et al. |
| 2004/0133689 | A1 | 7/2004 | Vasisht |
| 2004/0133793 | A1 | 7/2004 | Ginter et al. |
| 2004/0139170 | A1 | 7/2004 | Shen et al. |
| 2004/0152449 | A1 | 8/2004 | Koshihara |
| 2004/0153676 | A1 | 8/2004 | Krantz et al. |
| 2004/0185876 | A1 | 9/2004 | Groenendaal et al. |
| 2004/0205154 | A1 | 10/2004 | Dalton et al. |
| 2004/0205155 | A1 * | 10/2004 | Nobakht et al. ............... 709/217 |
| 2004/0218544 | A1 | 11/2004 | Lee |
| 2004/0250136 | A1 * | 12/2004 | Albertine Trappeniers et al. .......................... 713/201 |
| 2004/0264442 | A1 * | 12/2004 | Kubler .................. G06F 1/1626 370/352 |
| 2005/0008017 | A1 | 1/2005 | Datta et al. |
| 2005/0014525 | A1 | 1/2005 | Tsunehara et al. |
| 2005/0022013 | A1 | 1/2005 | Schwenk |
| 2005/0038905 | A1 | 2/2005 | Banes et al. |
| 2005/0086346 | A1 | 4/2005 | Meyer |
| 2005/0101340 | A1 | 5/2005 | Archiable |
| 2005/0108573 | A1 | 5/2005 | Bennett et al. |
| 2005/0113078 | A1 * | 5/2005 | Deitrich .................. H04W 4/16 455/417 |
| 2005/0198234 | A1 | 9/2005 | Leib et al. |
| 2005/0198319 | A1 * | 9/2005 | Chan et al. ..................... 709/228 |
| 2005/0221850 | A1 | 10/2005 | Kashiwase |
| 2005/0233728 | A1 | 10/2005 | Karaoguz et al. |
| 2005/0245233 | A1 * | 11/2005 | Anderson ..................... 455/411 |
| 2005/0246434 | A1 | 11/2005 | Bantz et al. |
| 2005/0250488 | A1 * | 11/2005 | Carbonaro ................. 455/426.1 |
| 2005/0259645 | A1 | 11/2005 | Chen et al. |
| 2005/0259654 | A1 | 11/2005 | Faulk, Jr. |
| 2005/0262248 | A1 | 11/2005 | Jennings, III et al. |
| 2005/0267965 | A1 * | 12/2005 | Heller .................. H04L 12/24 709/224 |
| 2006/0025141 | A1 * | 2/2006 | Marsh et al. ................. 455/445 |
| 2006/0047823 | A1 | 3/2006 | Cheng |
| 2006/0053290 | A1 | 3/2006 | Randle |
| 2006/0072474 | A1 | 4/2006 | Mitchell |
| 2006/0077607 | A1 | 4/2006 | Henricks et al. |
| 2006/0133582 | A1 | 6/2006 | McCulloch |
| 2006/0153216 | A1 | 7/2006 | Hosein et al. |
| 2006/0171402 | A1 | 8/2006 | Moore et al. |
| 2006/0184670 | A1 | 8/2006 | Beeson et al. |
| 2006/0187890 | A1 | 8/2006 | Lin |
| 2007/0002846 | A1 | 1/2007 | Rada et al. |
| 2007/0004436 | A1 * | 1/2007 | Stirbu .................. H04W 12/02 455/503 |
| 2007/0030857 | A1 | 2/2007 | Fulknier et al. |
| 2007/0081469 | A1 | 4/2007 | Tracy et al. |
| 2007/0083606 | A1 | 4/2007 | Malik et al. |
| 2007/0147324 | A1 | 6/2007 | McGary |
| 2007/0153689 | A1 | 7/2007 | Strub et al. |
| 2007/0177555 | A1 | 8/2007 | Brueck |
| 2007/0183399 | A1 * | 8/2007 | Bennett ........................ 370/352 |
| 2007/0233879 | A1 | 10/2007 | Woods et al. |
| 2007/0254727 | A1 | 11/2007 | Sewall et al. |
| 2007/0255848 | A1 | 11/2007 | Sewall et al. |
| 2007/0291711 | A1 | 12/2007 | Welch et al. |
| 2008/0005108 | A1 | 1/2008 | Ozzie et al. |
| 2008/0008165 | A1 | 1/2008 | Ikeda et al. |
| 2008/0039102 | A1 | 2/2008 | Sewall |
| 2008/0043626 | A1 | 2/2008 | Pham et al. |
| 2008/0043673 | A1 | 2/2008 | Johnson et al. |
| 2008/0046561 | A1 | 2/2008 | Pham et al. |
| 2008/0049630 | A1 | 2/2008 | Kozisek et al. |
| 2008/0051146 | A1 * | 2/2008 | Aslanian .............. H04M 1/72519 455/561 |
| 2008/0056222 | A1 | 3/2008 | Waites |
| 2008/0117860 | A1 | 5/2008 | Rodriguez et al. |
| 2008/0159167 | A1 | 7/2008 | Ito et al. |
| 2008/0177155 | A1 * | 7/2008 | Hansen et al. ................. 600/300 |
| 2008/0178172 | A1 | 7/2008 | Dossa et al. |
| 2008/0250478 | A1 | 10/2008 | Miller et al. |
| 2008/0259841 | A1 | 10/2008 | Deshpande |
| 2008/0267195 | A1 | 10/2008 | Belmon |
| 2008/0310407 | A1 | 12/2008 | Sewall et al. |
| 2008/0313327 | A1 | 12/2008 | Sewall et al. |
| 2009/0007096 | A1 | 1/2009 | Chavez et al. |
| 2009/0015419 | A1 | 1/2009 | Sewall et al. |
| 2009/0109959 | A1 | 4/2009 | Elliott et al. |
| 2009/0129319 | A1 | 5/2009 | Buddhikot et al. |
| 2009/0138447 | A1 | 5/2009 | Kalavade |
| 2009/0147700 | A1 | 6/2009 | Sewall et al. |
| 2009/0168789 | A1 | 7/2009 | Wood et al. |
| 2009/0172658 | A1 | 7/2009 | Wood et al. |

(56) References Cited

U.S. PATENT DOCUMENTS

| | | | |
|---|---|---|---|
| 2009/0172796 A1 | 7/2009 | Wood et al. | |
| 2009/0175285 A1 | 7/2009 | Wood et al. | |
| 2009/0180395 A1 | 7/2009 | Wood et al. | |
| 2009/0182845 A1 | 7/2009 | Johnson | |
| 2009/0207003 A1 | 8/2009 | Brekke et al. | |
| 2010/0014415 A1 | 1/2010 | Moeller | |
| 2010/0056186 A1* | 3/2010 | Hicks, III | H04M 3/42263 455/462 |
| 2010/0118846 A1 | 5/2010 | Moeller | |
| 2010/0202450 A1 | 8/2010 | Ansari et al. | |
| 2010/0231790 A1 | 9/2010 | Ansari et al. | |
| 2011/0051703 A1 | 3/2011 | Fulknier et al. | |
| 2011/0085486 A1* | 4/2011 | Huang | H04N 21/4223 370/312 |
| 2011/0167157 A1 | 7/2011 | Virgilio et al. | |
| 2011/0199932 A1 | 8/2011 | Short et al. | |
| 2013/0083662 A1* | 4/2013 | Rappaport | H04B 1/719 370/235 |

OTHER PUBLICATIONS

International Search Report & Written Opinion of the International Searching Authority for Application No. PCT/US07/62077, mailed Nov. 20, 2007.

International Search Report & Written Opinion of the International Searching Authority for Application No. PCT/US0/62078, mailed Mar. 5, 2008.

USPTO, "Final Office Action in U.S. Appl. No. 10/936,124.", Feb. 2, 2007.

USPTO, "Final Office Action in U.S. Appl. No. 10/936,124.", Feb. 9, 2009.

USPTO, "Final Office Action in U.S. Appl. No. 10/936,124.", Jul. 11, 2007.

USPTO, "Final Office Action in U.S. Appl. No. 10/936,124.", Sep. 3, 2009.

USPTO, "Office Action in U.S. Appl. No. 10/936,124.", Apr. 10, 2008.

USPTO, "Office Action in U.S. Appl. No. 10/936,124.", Jun. 26, 2006.

Webster's, "Router", Aug. 28, 2009, Publisher: Webster's New World Telcom Dictionary 2009, Your Dictionary, www.yourdictionary.com/telecom/router.

USPTO, "Final Office Action in U.S. Appl. No. 11/673,965.", Apr. 01, 2010.

USPTO, "Office Action in U.S. Appl. No. 11/673,965.", Sep. 2, 2009.

USPTO, "Advisory Action in U.S. Appl. No. 11/376,973", Mar. 19, 2010.

R. Elz, R Bush, "RFC 2181 Clarifications to the DNS Specification, Internet Engineering Task Force, http://tools.ietf.org/html/rfc2181, 1 page", Jul. 1997.

Vixie, S. Thomson, Y. Rekhter, J. Bound, "RFC 2136 Dynamic Updates in the Domain Name System (DNS Update), Internet Engineering Task Force, 51 pages.", Apr. 1997.

USPTO, "Final Office Action in U.S. Appl. No. 11/673,973.", Dec. 10, 2009.

USPTO, "Office Action in U.S. Appl. No. 11/673,973.", May 28, 2009.

Wikipedia, "Proxy Server, http://en.wikipedia.org/wiki/Proxy_server ; 9 pages,", Apr. 12, 2010.

USPTO, "Office Action in U.S. Appl. No. 12/172,885.", Apr. 26, 2010.

USPTO, "Office Action in U.S. Appl. No. 12/350,407.", Apr. 5, 2010.

PCT, "International Search Report and Written Opinion of the International Searching Authority for Application No. PCT/US2008/076836,", Mar. 6, 2009.

PCT, "International Search Report and Written Opinion of the International Searching Authority for Application No. PCT/US2008/083409,", May 12, 2009.

USPTO, "Office Action in U.S. Appl. No. 11/673,973", Jun. 24, 2010.

USPTO, "Office Action in U.S. Appl. No. 12/172,862", Aug. 31, 2010.

USPTO, Office Action in U.S. Appl. No. 11/673,965 dated Feb. 15, 2011.

USPTO, Office Action in U.S. Appl. No. 12/172,862 dated Feb. 14, 2011.

Office Action dated Aug. 20, 2012 issued in U.S. Appl. No. 12/172,862.

Office Action dated Aug. 21, 2012 issued in U.S. Appl. No. 12/350,407.

Office Action dated Sep. 12, 2012 issued in U.S. Appl. No. 12/350,460.

Final Office Action dated Apr. 10, 2013 issued in U.S. Appl. No. 12/350,460.

Final Office Action dated Apr. 10, 2013 issued in U.S. Appl. No. 12/351,502.

USPTO, Final Office Action in U.S. Appl. No. 12/172,885 dated Nov. 2, 2010.

In Motion Technology—Take Your Business on the Road—Mobile Hotspot, "In Motion Technology, Inc. Introduces Industry's First 3G Hotspot for Passenger Productivity.", Jul. 31, 2003, Publisher: http://www.inmotiontechnology.com/newsevents/carey.html.

Mikrotik, "MikroTik Router OS V28 Reference Manual", 2005.

Peng, Dar-Tzen; Shin, K.G.; Abdelzaher, T.F., "Assignment and scheduling communicating periodic tasks in distributed real-time systems", Dec. 1997, Publisher: Software Engineering, IEEE Transactions on, vol. 23, No. 12, pp. 745-758, Dec. 1997.

USPTO, Office Action in U.S. Appl. No. 12/270,419 dated Dec. 17, 2010.

USPTO, Final Office Action in U.S. Appl. No. 12/350,407 dated Dec. 14, 2010.

US Patent and Trademark Office, Office Action, U.S. Appl. No. 12/172,862, dated Jul. 27, 2011.

US Patent and Trademark Office, Final Office Action, U.S. Appl. No. 11/673,965, dated Aug. 4, 2011.

US Patent and Trademark Office, Office Action, U.S. Appl. No. 12/350,407, dated Jul. 6, 2011.

US Patent and Trademark Office, Final Office Action, U.S. Appl. No. 12/270,419, dated Jul. 11, 2011.

US Patent and Trademark Office, Office Action, U.S. Appl. No. 12/350,405, dated Feb. 16, 2012.

US Patent and Trademark Office, Final Office Action dated Mar. 15, 2012 for U.S. Appl. No. 12/843,541.

US Patent and Trademark Office, Office Action, U.S. Appl. No. 12/350,402, dated Apr. 16, 2012.

US Patent and Trademark Office; Office Action for U.S. Appl. No. 12/270,419 dated Mar. 27, 2012.

US Patent and Trademark Office, Office Action for U.S. Appl. No. 12/351,502 dated Apr. 25, 2012.

US Patent and Trademark Office, Final Office Action for U.S. Appl. No. 12/350,407 dated Jan. 3, 2012.

Router; http://www.yourdictionary.com/telecom/router; Aug. 28, 2009.

US Patent and Trademark Office, Office Action for U.S. Appl. No. 12/843,541 dated Jul. 18, 2012.

US Patent and Trademark Office, Final Office Action for U.S. Appl. No. 12/172,862 dated Apr. 24, 2012.

Office Action dated Sep. 23, 2014, issued in CA 2730490.

Office Action dated Sep. 24, 2014, issued in CA 2730483.

* cited by examiner

HOTSPOT COMMUNICATION LIMITER

CROSS REFERENCE TO RELATED APPLICATIONS

This application claims the priority of provisional applications 60/772,777 entitled Metered Services filed Feb. 13, 2006 and hereby incorporated by reference. Application 60/722,777 is incorporated herein by reference. This application is a continuation in part of application Ser. No. 10/936,124 entitled Device Cradle filed Sep. 8, 2004 now U.S. Pat. No. 7,764,784. Application Ser. No. 10/936,124 is incorporated herein by reference.

BACKGROUND

Cellular service providers sell data plans to customers. To ensure that the costs of operating the cellular data network are matched to the income from selling data plans, network operators often impose use limitations on each subscriber. These limitations include constraining: available time of day/week; total time connected; quantity of data moved through the network; accessible portions of the network and so forth.

This business model assumes each account is matched to a single-user network. For example, a cellular telephone may be coupled via a USB cable to a personal computer creating a single user network. Through this connection, the personal computer can gain internet access via the data capabilities of the cellular telephone. Various embodiments allow for a multiple user network in which each user accesses the internet via a single cellular telephone. There is currently no practical way for cellular service providers to distinguish between different users in such a network.

DETAILED DESCRIPTION

INTRODUCTION: Embodiments of the present invention allow a user to connect to the internet using a device such as an internet enabled cellular telephone. With a personal hotspot, multiple users of computing devices such as lap top computers, desktop computers, and personal digital assistants (PDAs) can access the internet simultaneously through the data capabilities of that cellular telephone. The combination of the personal hotspot and the internet enabled cellular telephone can provide an internet-connected wireless network anywhere that there is cellular data coverage.

Various embodiments described below operate to selectively limit the use of a personal hotspot. For example, certain limitations may apply to the personal hotspot itself and thus apply to all users. Some limitations may apply to the owner of the personal hotspot. Other limitations may apply to users authorized by the owner. Yet other limitations may apply to anonymous users. In this manner, the personal hotspot distinguishes between a variety of different users and user types.

Figure 1:
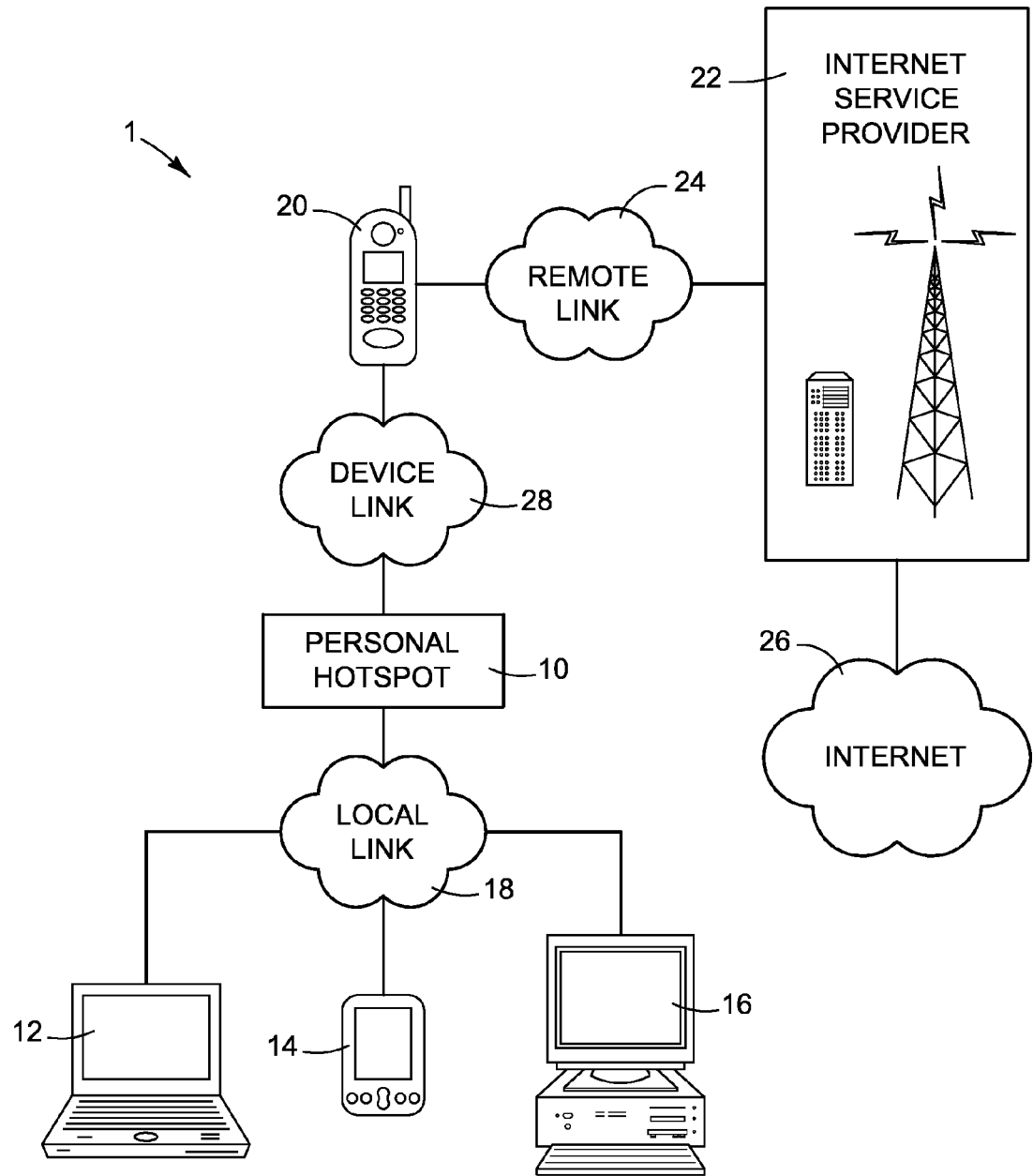
FIGS. 1 and 2 illustrate an exemplary block diagrams of environments in which embodiments of the present invention can be implemented.

ENVIRONMENT: FIG. 1 illustrates exemplary environment 1 in which various embodiments of the present invention may be implemented. Environment 1 includes personal hotspot 10 and client devices 12, 14, and 16 and local link 18. Personal hotspot 10, discussed in more detail later, represents generally a device capable or routing network communications between client devices 12, 14, and 16 and internet 26 via a data exchanger 20. Client devices 12, 14, and 16 represent generally any computing devices capable of communicating with personal hotspot 10.

Local link 18 interconnects personal hotspot 10 and client devices 12, 14, 16. Local link 18 represents generally a cable, wireless, or remote link via a telecommunication link, an infrared link, a radio frequency link, or any other connector or system that provides electronic communication between devices 10, 12, 14, and 16. The path followed by link 18 between devices 10, 12, 14, and 16 in the schematic view of FIG. 1 represents the logical communication path between these devices, not necessarily the physical path between the devices. Devices 10, 12, 14, and 16 can be connected at any point and the appropriate communication path established logically between the devices.

Environment 1 also includes data exchanger 20 and service provider 22. Data exchanger (20) represents generally and combination of hardware and/or programming that can be utilized by personal hotspot 10 to connect to a remote network such as the internet. While illustrated as an internet enabled cellular telephone, data exchanger 20 is not so limited. For example, data exchanger 20 may be a PCMCIA card or other device capable of cellular data communication. Internet enabled cellular telephones and other devices that are capable of data communications over a cellular network are referred to herein as data capable cellular devices. Other examples for data exchanger 20 include but are not limited to DSL modems and cable modems.

Service provider 22 represents generally any infrastructure configured to provide internet related data services to subscribers such as an owner of data exchanger 20. For example, where data exchanger 20 is an data capable cellular devices, service provider 22 may be a cellular telephone service provider capable of providing voice and data services to subscribers allowing access to internet 26. Where data exchanger 22 is a DSL or cable modem, service provider 22 may be a more traditional internet service provider (ISP) providing data access to internet 26.

Remote link 24 interconnects data exchanger 20 and service provider 22 and represents generally any combination of a cable, wireless, or remote connection via a telecommunication link, an infrared link, a radio frequency link, or any other connector or system that provides electronic communication between data exchanger 20 and service provider 22. Remote link 30 may represent an intranet, an internet, or a combination of both.

In the embodiment illustrated in environment 1, device link 28 interconnects personal hotspot 10 and data exchanger 20. Device link 28 represents generally any combination of a cable, wireless, or remote connection via a telecommunication link, an infrared link, a radio frequency link, or any other connector or system that provides electronic communication between devices 10 and 20. As examples, device link 28 may incorporate a physical USB cable or radio waves carrying Bluetooth communications.

Communication between client devices 12, 14, and 16 and internet 26 is dependent upon personal hotspot 10. Personal hotspot 10, as discussed below with respect to FIGS. 3-6, includes components capable of distinguishing among the user's of client devices 12, 14, and 16, and applying different internet access rules for different users.

Figure 2:
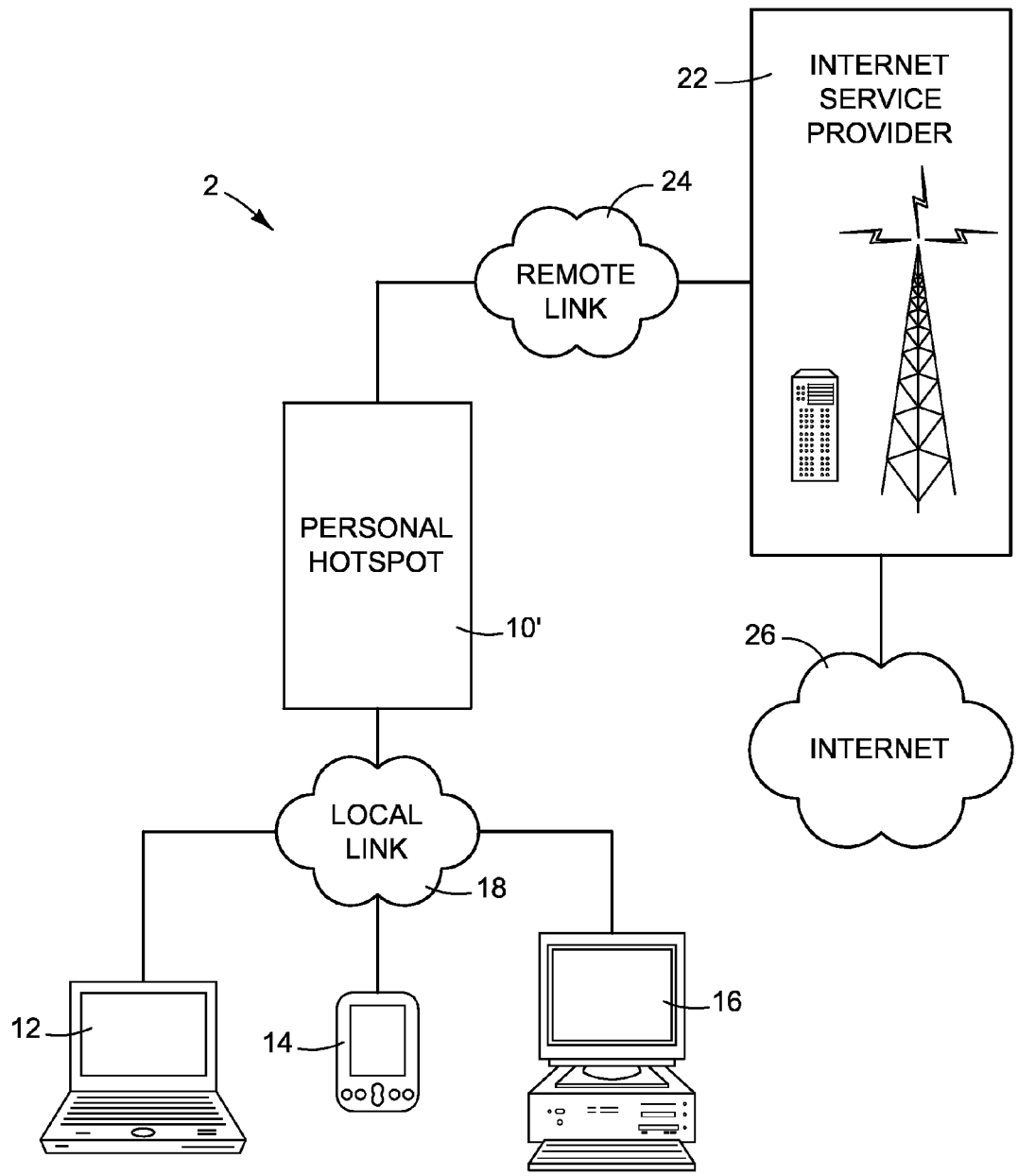

FIG. 2 illustrates another exemplary environment 2 in which various embodiments of the present invention may be implemented. In the example of FIG. 2, data exchanger 20 (not shown) and personal hotspot 10 are incorporated within the same device. Device link 32 (shown in FIG. 1) is eliminated and replaced with internal connections. In such a scenario, data exchanger may take the form of a PCMCIA card or any other device that can be inserter into a slot or otherwise coupled to personal hotspot 10. Alternatively, data exchanger 20 may be fully integrated into personal hotspot 10

Figure 3:
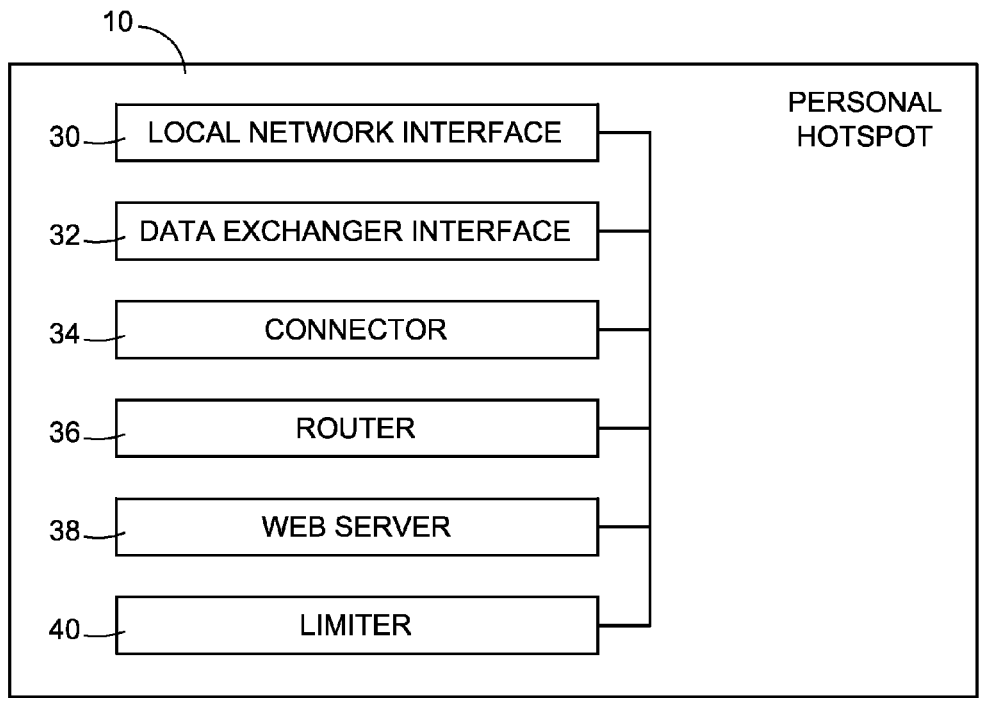
FIGS. 3-6 are block diagrams showing physical and logical components of a personal hotspot according to an embodiment of the present invention.

PERSONAL HOTSPOT: FIG. 3 is a block diagram illustrating physical and logical components of personal hotspot 10. As described above, personal hotspot 10 represents generally any combination of hardware and/or programming capable functioning as a router for directing network communications between client devices and the internet via a data exchanger such as a data capable cellular device, DSL modem, or cable modem.

In the example of FIG. 3 personal hotspot 10 includes local network interface 30 and data exchanger interface 32. Local network interface 30 represents generally any combination of hardware and/or program instructions capable of supplying a communication interface between personal hotspot 10 and client devices 12, 14, and 16 shown in FIGS. 1 and 2. Data exchanger interface 32 represents any combination of hardware and/or programming enabling data to be communicated between personal hotspot 10 and a data exchanger 20 shown in FIG. 1. For example, interfaces 30 and 32 may include a transceiver operable to exchange network communications utilizing a wireless protocol such as ultrawideband (UWB), Bluetooth, or 802.11. Alternatively, interfaces 30 and 32 may include physical ports or other physical connection points enabling wired communication.

Personal hotspot 10 also includes connector 50, router 36, web server 38, and limiter 40. Connector 34 represents generally any combination of hardware and/or programming for sending a signal to data exchanger 20 to connect to establish a data connection with service provider 22 so that access can be made to internet 26. For example, where a data exchanger 20 is a data capable cellular device, connector 34 may send a signal causing the data capable cellular device to establish such a data link with service provider 22.

Router 36 represents generally any combination of hardware and/or programming for routing network communication received through network interface 30 to be transmitted by data exchanger 20 to internet 26. Router 36 is also responsible for routing inbound network communications received from internet 26 and directed via network interface 30 to a specified client device 12, 14, or 16. Outbound and inbound network communications, for example can be an IP (internet Protocol) packets directed to a target on internet 26 or to a particular network device 12, 14, or 16 on a local area network.

Web server 38 represents generally any combination of hardware and/or programming capable of serving interfaces such as web pages to client devices 12, 14, and 16. Such web pages may include web pages that when displayed by a network device allows a user to provide or otherwise select settings related to the operation of personal hotspot 10.

Figure 4:
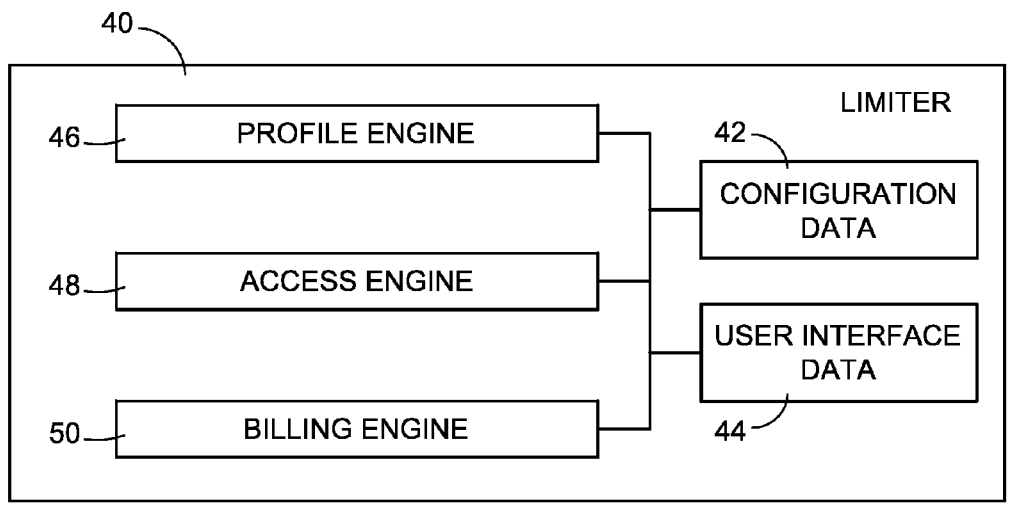

Limiter 40, discussed in more detail below with respect to FIG. 4, represents generally any combination of hardware and/or programming capable of distinguishing among the users of devices such as client devices 12, 14, and 16, and applying different internet access rules for different users. For example, certain internet access rules may apply to the owner of personal hotspot 10. In this context, the term owner refers to an individual or entity that is a subscriber with respect to a service provider such as service provider 22 shown in FIGS. 1 and 2. The owner typically has physical possession or otherwise has control of personal hotspot 10. Other internet access rules can apply to users authorized by the owner. Yet other internet access rules apply to anonymous users. Where network interface 30 provides for a wireless connection with client devices, a user of a particular client device might not be known by the owner. As such, internet access rules for such users may be quite limiting.

Figure 5:
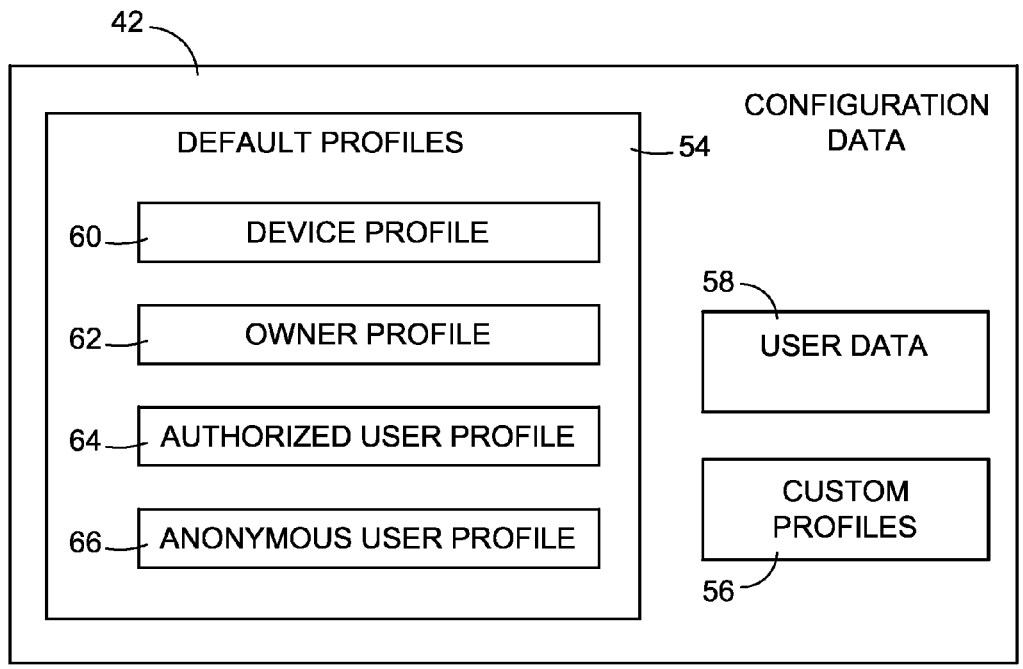
Figure 6:
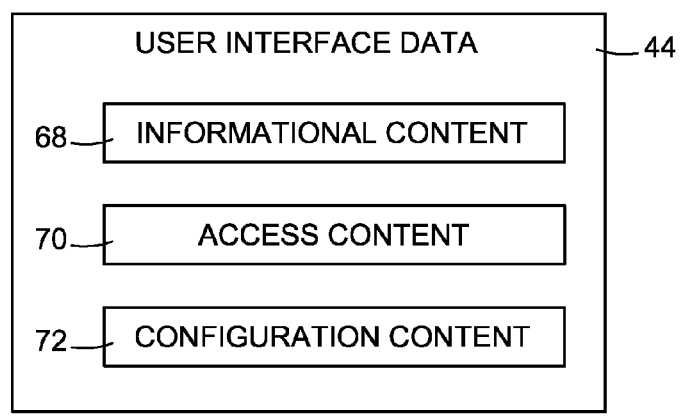

FIG. 4 is a block diagram illustrating physical and logical components of limiter 40. In this example, limiter is shown to include configuration data 42, user interface data 44, profile engine 46, access engine 48, and billing engine 50. Configuration data 42, discussed in more detail below with respect to FIG. 5, represents generally a collection of information including access rules for personal hotspot 10. As discussed above, different access rules can be associated with different users such an owner, a user authorized by the owner, and an anonymous user. User interface data 44, discussed in more detail below with respect to FIG. 6, represents data used to present a client device with user interfaces such as web pages or other content that can be served to a client device. Such user interfaces can be informational, they can provide controls for supplying identifying information such as a user name and password as well as any payment information needed to access personal hotspot 10.

Profile engine 46 represents generally any combination of hardware and/or programming capable of maintaining configuration data 42. In one example, an owner of personal hotspot 10 sends a communication from a client device for a web page for updating configuration data 42. Router 36 passes the communication to limiter 40. Profile engine 46 causes web server 38 to access user interface data 44 and return a user interface having controls for updating configuration data. The owner's selections are returned to profile engine 46 which then updates configuration data 42.

In another example, configuration data may be provided by service provider 22 shown in FIGS. 1 and 2. In this way, access rules defined by configuration data 42 can be customized based on a subscription plan paid for by the owner of data exchanger 20. A basic subscription package might then have more stringent access rules than a premium subscription package. In this example, when personal hotspot 10 is connected to data exchanger 20, connector 34 causes data exchanger 20 to establish a data connection to service provider 22. As part of the negotiations, personal hotspot 10 requests configuration data, data exchanger 20 communicates the request to service provider 22. Service provider 22 returns configuration data 42 or a portion thereof for use by limiter 40. The configuration data 42 returned by service provider 22 or portions thereof may or may not be updateable by the owner of personal hotspot 10.

Access engine 48 represents generally any combination of hardware and/or programming capable of limiting the routing of communications according to configuration data 42. Referring back to FIG. 1 for an example, a user of a client device 12, 14, or 16, sends a request for content from internet 26. That communication hits personal hotspot 10. Before router 36 routes the communication, access engine 48 applies access rules obtained from configuration data 42. The configuration data may indicate that the source of the communication is not an owner and is not authorized by the owner to access personal hotspot 10. Where configuration data 42 indicates that such anonymous communications are to be blocked, access engine 48 prevents the communication from being routed to internet 26. Other access rules might limit a user's duration of use, limit bandwidth available to a given user, or limit the amount of data a particular user or type of user can download in a given time period. In such situations, access engine 48 is responsible for blocking communications from and even to a user once that user's has reached a duration, download, or bandwidth limit.

When access engine 48 blocks communications, it may cause web server 38 to access user interface data 44 and return a communication to the source of the communication. That communication may explain why the communication was blocked and provide instructions, if any, for gaining access to personal hotspot 10.

Billing engine 50 represents generally any combination of hardware and/or programming capable of interacting with an internet payment service. As an example, configuration data 42 may indicate that paid access is allowed. When an anonymous user first attempts to access the internet via personal hotspot 10, access engine 48 blocks the communication, and billing engine 50 causes web server 38 to access user interface data 44 and return a user interface having controls for supplying payment information to a payment service on internet 26. Payment information may include credentials for accessing an existing account with the payment service. Payment information may also include information needed to establish such an account.

After the anonymous user submits payment information to the payment service, the payment service verifies the information and informs billing engine 50 that the anonymous user is now authorized. The newly authorized user may be paying for a time block or may be being charged based on use. For Example, the user may purchase a set amount of time such as an hour or the user may be paying a certain amount per minute, hour, or other unit of time.

Where the user is paying per unit of time, billing agent may be responsible for periodically communicating with or otherwise checking in with the payment service. When the user logs out, billing engine 50 notifies the payment service to stop billing the user. Also, if personal hotspot 10 loses a connection to internet 26, the payment service would notice that billing engine 50 had stopped checking in and would stop billing the customer.

The payment service could by a single billing service such as PAYPAL®. Payment service may be a combination of a collection service and a billing service. For example, the owner of personal hotspot 10 may subscribe to an internet based collection service capable of communicating with a billing service and receiving payment from the billing service on behalf of the owner. The anonymous user submits payment information to the billing service. The billing service verifies the payment information and communicates approval to the collection service. Billing engine 50 periodically checks in with the collection service and is informed that the user is now authorized. Billing engine 50 updates configuration data 42 to indicate that the anonymous user has access to personal hotspot 10.

Billing engine 50 continues to check in with the collection service. when the anonymous user logs out, billing engine 50 notifies collection service so that the collection service can instruct the billing service to stop billing the user. Also, if personal hotspot 10 loses a connection to internet 26, the collection service would notice that billing engine 50 had stopped checking in and would instruct the billing service to stop billing the anonymous user.

FIG. 5 is a block diagram illustrating the logical elements of configuration data 42. In the example of FIG. 5, configuration data 42 includes default profiles 54, custom profiles 56, and user data 58. Utilizing these three elements, access engine 48 determines whether or not the communication will be blocked.

Default profiles 60 include device profile 60, owner profile 62, authorized user profile 64, and anonymous user profile 66. Device profile 60 represents access rules applies to all users of personal hotspot 10. Such device access rules may specify upload and download bandwidth limits. The device access rules may limit the amount of data transfer allowed in a given time period. The device access rules may limit the number of simultaneous users or sessions supported by personal hotspot. As noted above, the nature of the device access rules may be dependent upon the nature of the data subscription package the owner of data exchanger 20 has with service provider 22. A premium package may have less stringent limitations than a basic subscription package.

Where configuration data 42 is supplied by service provider 22 as discussed above, device profile 60 may not be editable by the owner of personal hotspot 10. As an example, when supplying configuration data 42, the service provider 22 may supply only device profile 60. The remainder of configuration data 42 may be editable and data installed by the manufacturer or reseller of personal hotspot 10.

Owner profile 62 represents access rules for the owner of personal hotspot 10. Authorized user profile 62 represents access rules for user's authorized by the owner. Anonymous user profile 66 represents access rules for anonymous users of personal hotspot 10. Such access rules may specify upload and download bandwidth limits. The access rules may limit the amount of data transfer allowed in a given time period. Typically, anonymous user access rules will be more limiting than authorized user access rules, and authorized user access rule will be more limiting than owner access rules. Moreover, anonymous user profile 64 may indicate anonymous user are to be blocked or it may indicate that payment is required.

Custom profiles 56 represents a collection of owner specified access rules for specified users. For example, the owner may desire to provided customized access rules for a particular user. For example, the owner may desire to provide a spouse or personal friend with less limited access than other authorized users. That same owner may desire to provide a child with more limited access.

User data 58 represents data associating a particular user with a profile. The owner of personal hotspot 10 is associated with owner profile 62. An authorized user may be associated with authorized user profile 64 or one of custom profiles 56. User data 58, for example, may be a table having a series of records, one for the owner and one for each authorized user. Each record will have a field containing data for identifying the particular user and another field containing data identifying the profile associated with that user. The data identifying the user, for example could be a user name password combination, a cookie value, or a hardware address of the user's client device. Each record may also contain usage data and expiration data for a particular user. Usage data may reflect the amount of data uploaded or downloaded in a particular time frame and any expiration data. The expiration data may indicate a time that particular record is to be deleted de-authorizing that particular user.

When determining if a particular communication is to be blocked, access engine 48 identifies a communication type. The type is an indicator of the nature of the particular user from or to which the communication is to be routed. To do so, access engine 48 may analyze the communication to identify the hardware address of the source client device, or access engine 48 may identify a cookie value contained in the communication. Alternatively, access engine may cause web server 38 to access user interface data 44 and return a user interface having controls for supplying credentials such as a user name and password. Using the identifying information, access engine 48 identifies a profile associated with the user in user data 58. Access engine 48 then examines the user's usage data, accesses the profile and determines whether or not to block the communication. If the user cannot be identified in user data 58, access engine 48 uses anonymous user profile 66 in making the determination as to whether or not to block the communication.

FIG. 6 is a block diagram illustrating the logical elements of user interface data 44. In the example of FIG. 6, user interface data includes informational content 68, access content 70, and configuration content 72. Informational content 68 represents web pages or other content that can identify personal hotspot 10 and its owner. It can include content that explains why a communication is being blocked and provide guidance as how to attain access.

Access content 70 represents web pages or other content used to supply credentials for accessing personal hotspot such as a user name and password. Access content can also include web pages for supplying payment information to a payment service. Configuration content 72 represents web pages or other content used to update configuration data 42.

Figure 7:
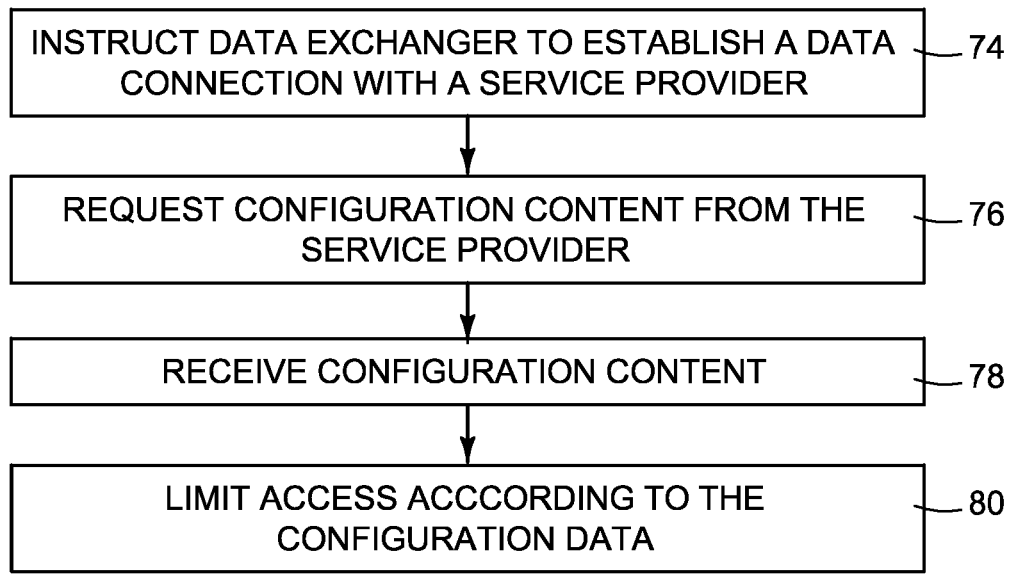
FIGS. 7-9 are exemplary flow diagram illustrating steps taken in performance of various embodiments of the present invention.
Figure 8:
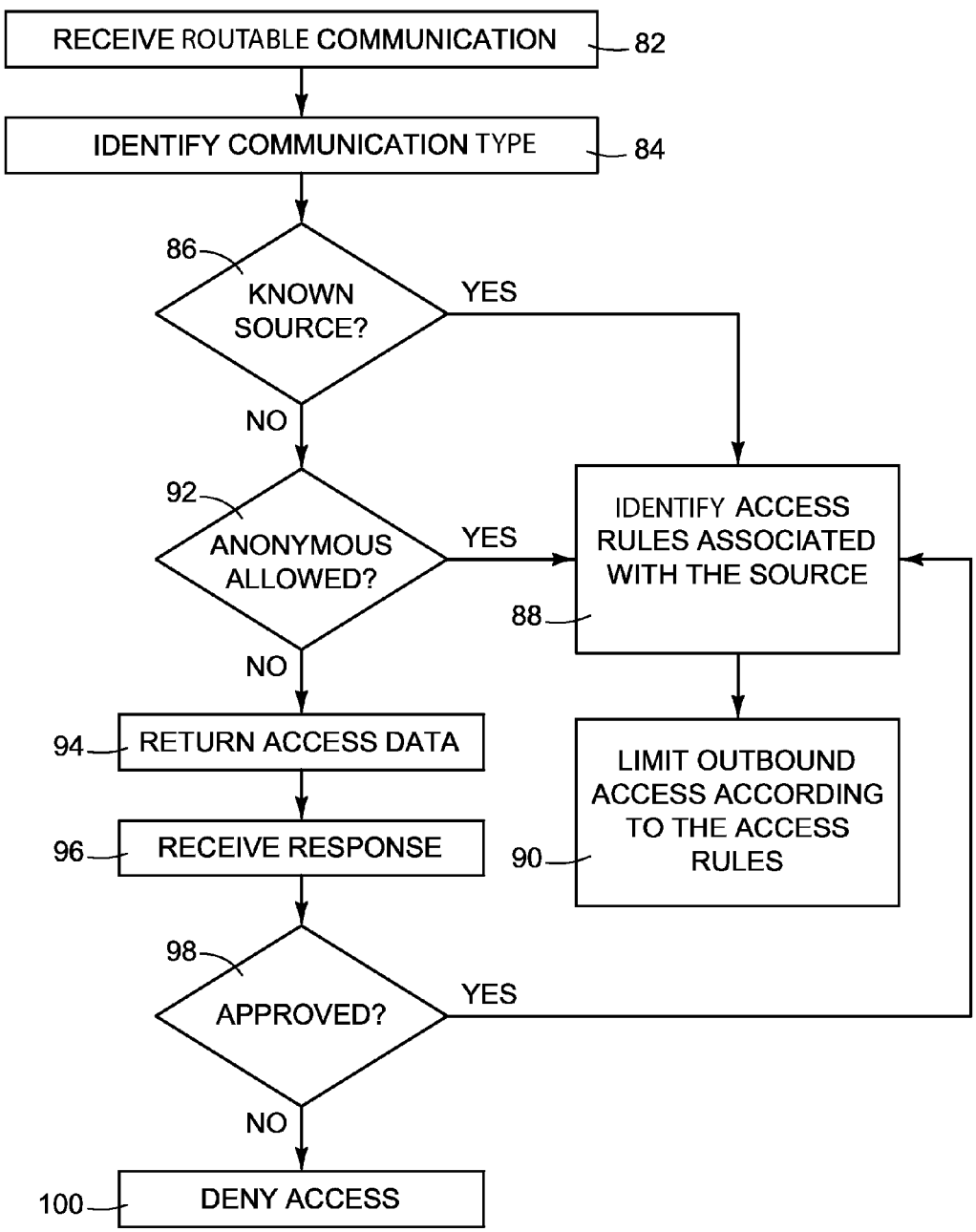
Figure 9:
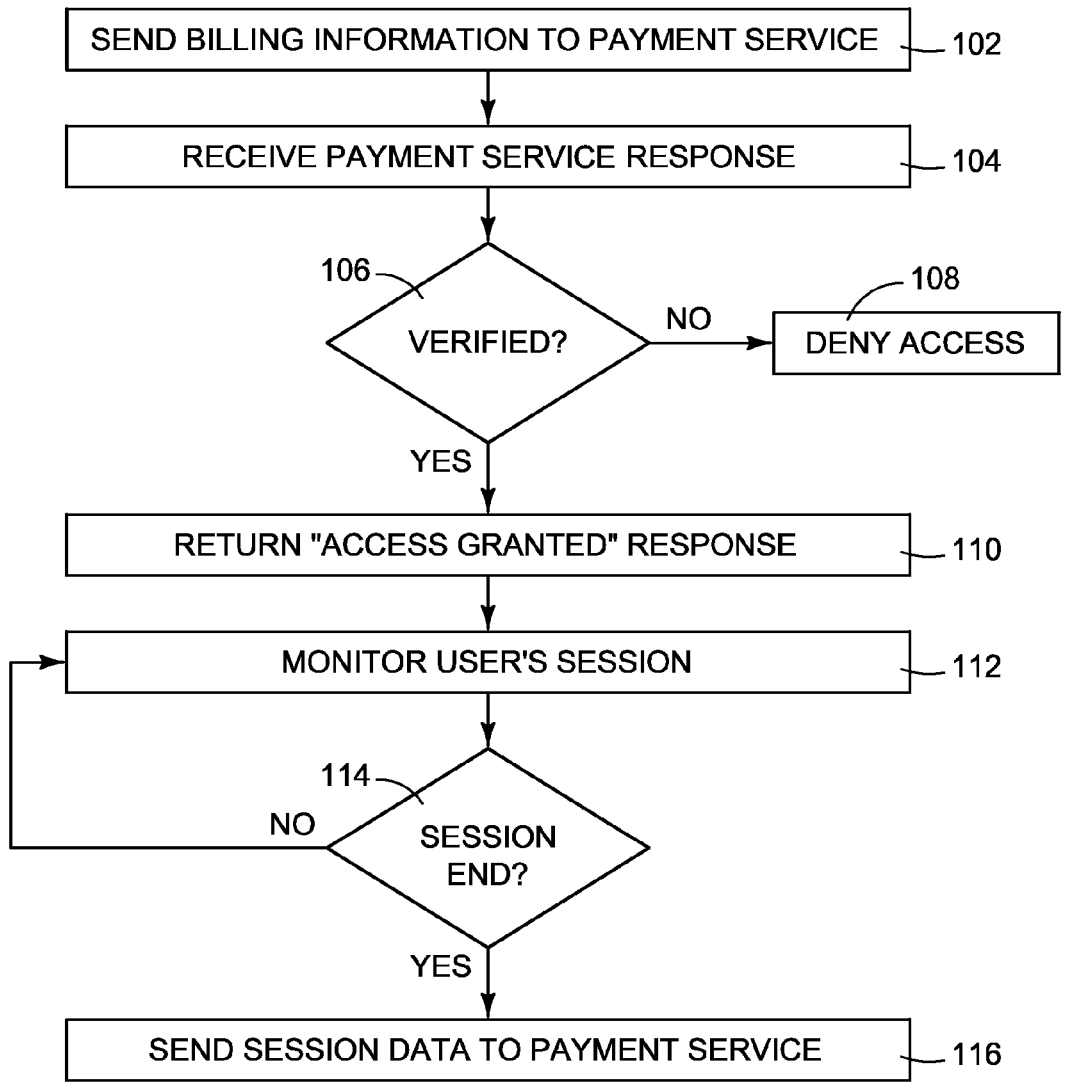

OPERATION: The operation of embodiments of the present invention will now be described with reference to FIGS. 7-9. FIG. 7 is an exemplary flow diagram that helps illustrate actions taken to obtain configuration data from a service provider. FIG. 8 is an exemplary flow diagram that helps illustrate actions taken by personal hotspot 10 to limit communications. FIG. 9 is an exemplary flow diagram that helps illustrate actions taken by personal hotspot 10 related to billing.

Starting with FIG. 7 and with reference to FIG. 1, personal hotspot 10 instructs data exchanger 20 to establish a data connection to internet 26 via service provider 22 (step 74). In the Example of FIG. 1, personal hotspot 10 couples to data exchanger 20 via device link 32. Device link 32 may be a wired link utilizing a protocol such as USB or a wireless link utilizing a protocol such as Bluetooth. Personal hotspot 10 and data exchanger 20 negotiate a link according the particular protocol in use. As part of that negotiation, connector 34 (FIG. 3) instructs data exchanger 20 to negotiate a connection to internet 26 via service provider 22.

Configuration content is requested from the service provider (step 76). Continuing with the above example, step 76 may be accomplished in a number of fashions. Connector 34 or some other component of personal hotspot 10 may request the configuration content or data exchanger 20 may request the configuration content. Such requests may be active or passive. An active request is a direct request made to service provider 22. An HTTP GET request is an example of an active request. A passive request, for example can occur by providing some form of identifying information to service provider 22. Identifying information may be information identifying the existence of personal hotspot 10 and a version of the configuration data currently stored on personal hotspot 10. The service provider 22 processes this information to determine if and/or what configuration data is to be returned. The identifying information may identify the owner of data exchanger 20 and/or the owner of personal hotspot 10. Using this information, service provider 22 can identify a data subscription plan paid for by the owner. Service provider 22 can then identify and return the appropriate configuration data. Personal hotspot 10 receives the requested configuration data (step 78) and limits access according to the configuration data (step 80).

The configuration data requested and received in steps 76 and 78 may be a subset of configuration data 42 shown in FIG. 5. As noted earlier, the configuration data received may include default profiles 54 or simply include device profile 60. In this manner, the owner of personal hotspot 10 can select settings for the remainder of configuration data 42 as desired. Alternatively, the owner may be allowed to select settings for all of configuration data 42.

Moving to FIG. 8, personal hotspot 10 receives a routable communication (step 82). As noted, a routable communication is a network communication that if not blocked will be routed from a client device 12, 14, or 16 to internet 26 or from internet 26 to a client device 12, 14, or 16. For example, step 82 may occur when a user of a client device 12, 14, or 16 selects a link on a web page, manually enters an URL (Uniform Resource Locator) in a browser, or when a web site responds.

Personal hotspot 10 identifies the communication type (step 84). A communication type may be "owner" if the communication originated from or is directed to an owner of personal hotspot 10. A communication type may be "authorized" if the communication originated from or is directed to an authorized user. A communication type may be "anonymous" if the communication originated from or is directed to an anonymous user. Step 84 may, for example, be accomplished by examining the communication to recognize information such as a hardware address identifying the client device from which the communication originated or is directed to. It is then determined based on the identified communication type if the source of the communication is known to personal hotspot 10. In the example of FIGS. 4 and 5, access engine 48 may recognize the identifying information and determine if that information can be found in user data 58. If present, the source is known to personal hotspot 10. If not found, the source is not known.

If the source of the communication is known to personal hotspot 10, access rules associated with the source are identified (step 88). Continuing with the example above, step 88 may be accomplished by access engine 48. In accomplishing this task, access engine 48 parses configuration data 42 and identifies a profile associated with the information identifying the source of the communication found in user data 58. Depending on the known source, the profile may be authorized user profile 64, owner profile 62, or one of custom profiles 56.

From the identified profile, access engine 48 extrapolates the access rules for the source and limits access to personal hotspot 10 according to those access rules (90). Step 90 can involve blocking the routable communication received in step 82 or allowing the communication to be routed to its intended destination. For example, it is determined if routing the communication to its intended destination will contravene the access rules. The communication is routed only if the access rules will not be contravened. Where the access rules limit the available bandwidth or amount of data that can be uploaded or downloaded, the routable communication can be blocked when access engine 48 determines that such a limit has or will be exceeded. Where access rules limit the number of simultaneous connections to the internet using personal hotspot 10, the communication can be blocked when access engine 48 determines that the limit has or will be exceeded. Where access rules limit the term, the routable communication can be blocked when access engine 48 determines that the term has not expired or is otherwise active. A term is a time period for which access is allowed. For example, a user may be given access for a fixed time frame of an hour, a day, a week, or some other period. That period may or may not repeat. For example, a user may be given access during a particular time period each day.

Moving back to step 86, if the source of the communication is not known to personal hotspot 86, it is determined if anonymous communications are allowed (step 92). Access engine 48 may make the determination of step 92 by accessing anonymous user profile 66. If anonymous communications are allowed, the process continues with step 88. Continuing with the example, access engine 48 would then access anonymous user profile 66, extrapolate access rules for the anonymous user (step 88) and limit access accordingly (Step 90).

If anonymous communications are not allowed, access data for personal hotspot 10 is returned to the source of the communication received in step 82 (step 94). Access data, for example, may be a web page informing a user how to contact the owner of personal hotspot 10 to request to become an authorized user. Access data may be a web page for providing payment information to a payment service as described above. The access data may provide instructions for manually approaching the owner of personal hotspot 10 and verbally requesting access. The access data may be a web page having instructions for sending an electronic request such as an electronic mail or text message to the owner. Step 94 may be accomplished as access engine 48 causes web server 38 to access user interface data 44 and return an appropriate user interface to the source of the communication.

A response to the access request is received (step 96). The nature of the response is determined (step 98). If the response indicates that access to personal hotspot 10 is not approved, access is denied (step 100). Otherwise, the process skips back to step 88. A response can take a number of forms. For example, a non-response can indicate that access is to be denied. A response verifying payment information might come from a payment service. A response may come from the owner of personal hotspot 10 after receiving a verbal or electronic request. When access is approved, configuration data 42 is updated to include user data 58 for the source of the request. That user data 58 associates the source with either a default profile 54 or a custom profile 56. Access to personal hotspot 10 is then limited in step 90 according to the particular profile associated with that user data 58.

As discussed above, personal hotspot 10 may require payment for access. FIG. 9 is an exemplary flow diagram that helps illustrate actions taken by personal hotspot 10 related to billing. In step 94 above, personal hotspot 10 returned access data to a user of a client device. In this example, the access data is a web page for providing payment information to a payment service accessed via the internet. The payment information is routed to the payment service (step 102). A response is received from the payment service (step 104).

It is determined if the payment information was verified by the payment service (step 106). If not, access to personal hotspot 10 is denied (step 108). If the payment information is verified, personal hotspot 10 returns an "access granted" response to the user (step 110). Once access has been granted, personal hotspot 10 maintains configuration data 42 related to that user. As discussed, this configuration data 42 can include user data 58 identifying the user and associating the user with an authorized user profile. As such subsequent communications from that source will be identified as authorized communications to be routed to their intended destinations.

The user's session with personal hotspot 10 is monitored (step 112) to determine if that session has ended (step 114). As an example, user data 58 for the particular user may be present in configuration data 42 as long as the user's session is active. When the user's session ends, billing engine 50 may delete or otherwise inactivate the user data 58 for the user. The user's session may end when the user manually logs out or otherwise disconnects from personal hotspot 10. The user's session can also end when personal hotspot 10 loses a connection to the internet.

When the session ends, session data is sent to the payment service (step 116). In performing step 116, billing engine 50, for example, may send the payment service an indication that the user's session with personal hotspot 10 has ended. Payment service then bills the user accordingly. Billing engine 50 may also periodically "check-in" with the payment service indicating to the payment service that the personal hotspot 10 has an active connection to the internet. When billing service misses one or more scheduled "check-ins," the payment service can presume that the personal hotspot 10 has lost a connection to the internet and the session has ended.

CONCLUSION: The schematic diagrams of FIGS. 1 and 2 illustrate exemplary environments in which embodiments of the present invention may be implemented. Implementation, however, is not limited to these environments. The diagrams of FIGS. 3-6 show the architecture, functionality, and operation of various embodiments of the present invention. A number of the blocks are defined as programs. Each of those blocks may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 7-9 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:
1. A method for limiting network communications comprising:
   receiving a routable data communication;
   identifying a communication type for the routable data communication, the identifiable communication types including at least an owner communication type, an authorized communication type, and an anonymous communication type, wherein the identified communication type is an anonymous communication type;

identifying access rules for the identified communication type; and limiting the routing of the data communication according to the identified access rules, wherein the limiting the routing of the data communication includes allowing the data communication to be routed if the identified access rules indicate that anonymous communications are allowed, and preventing the data communication from being routed and causing access data to be communicated to the source of the data communication if the identified access rules indicate that anonymous communications are not allowed, wherein the method is implemented at a networking device through which data communications are routed between multiple computing client devices and an external cellular data network to enable simultaneous data communication between the multiple computing client devices and the external cellular data network, and wherein the networking device is connected to the external cellular data network wirelessly.

2. The method of claim 1, wherein limiting comprises determining if routing the data communication to its intended destination will contravene the access rules and routing the data communication to its intended destination only if it is determined that the access rules will not be contravened.

3. The method of claim 2, wherein identifying access rules comprises identifying one or more of a term limit, a simultaneous sessions limit, a simultaneous users limit, a session limit, a bandwidth limit, and a data transfer limit.

4. The method of claim 1, further comprising obtaining configuration data and wherein identifying access rules comprises parsing the configuration data to identify the access rules for the identified communication type.

5. The method of claim 4, wherein the networking device connects to the internet via a data exchanger and wherein obtaining comprises obtaining the configuration data from a service provider for the data exchanger.

6. The method of claim 5, wherein the data exchanger is a data capable cellular device and wherein obtaining comprises causing the data exchanger to establish a data connection with the service provider and receiving the configuration data from the service provider via the data connection.

7. The method of claim 5, wherein the data exchanger is incorporated within the networking device.

8. The method of claim 1, wherein causing access data to be communicated comprises causing a user interface for entering payment information to be communicated to the source, the payment information to be communicated to a payment service.

9. The method of claim 8, further comprising receiving a verification response from the payment service and if the verification response verifies the payment information, identifying subsequent data communications from the source as authorized communications to be routed to their intended destinations.

10. The method of claim 9, wherein if the verification response indicates that the payment information is verified, monitoring a session corresponding to the source of the data communication and communicating session data to the payment service.

11. The method of claim 1, wherein access to the external cellular data network from the networking device is provided by a data capable cellular phone.

12. The method of claim 1, wherein the communication type for the routable data communication is identified within the limiter before routing the routable data communication.

13. The method of claim 1, wherein identifying access rules comprises identifying a simultaneous users limit.

14. A non-transitory computer readable medium having computer executable instructions for:

receiving a routable data communication from at least one of multiple computing client devices;

identifying a communication type for the routable data communication, the identifiable communication types including at least a first communication type, a second communication type, and a third communication type, wherein the identified communication type is an anonymous communication type;

identifying access rules for the identified communication type;

limiting the routing of the data communication according to the identified access rules, wherein the instructions for limiting the routing of the data communication include allowing the data communication to be routed if the identified access rules indicate that anonymous communications are allowed, and preventing the data communication from being routed and causing access data to be communicated to the source of the data communication if the identified access rules indicate that anonymous communications are not allowed; and providing simultaneous data communication between the at least one computing client device and the internet and between at least another computing client device and the internet through a networking device and an external cellular data network that are wirelessly connected, wherein the first communication type is an owner communication type, wherein the second communication type is an authorized communication type, and wherein the third communication type is an anonymous communication type.

15. The non-transitory computer readable medium of claim 14, wherein the instructions for limiting include instructions for determining if routing the data communication to its intended destination will contravene the access rules and routing the data communication to its intended destination only if it is determined that the access rules will not be contravened.

16. The non-transitory computer readable medium of claim 14, having further instructions for obtaining configuration data and wherein the instructions for identifying access rules include instructions for parsing the configuration data to identify the access rules for the identified communication type.

17. The non-transitory computer readable medium of claim 16, wherein the instructions are executed by a device through which data communications can be routed between computing client devices and the internet via a data exchanger and wherein the instructions for obtaining include instructions for obtaining the configuration data from a service provider for the data exchanger.

18. The non-transitory computer readable medium of claim 17, wherein the instructions for the data exchanger is a data capable cellular device and wherein the instructions for obtaining include instructions for causing the data exchanger to establish a data connection with the service provider and receiving the configuration data from the service provider via the data connection.

19. The non-transitory computer readable medium of claim 14, wherein the instructions for causing access data to be communicated include instructions for causing a user interface for entering payment information to be communicated to the source, the payment information to be communicated to a payment service.

20. The non-transitory computer readable medium of claim 19, having further instructions for receiving a verification response from the payment service and if the verification response verifies the payment information, identifying subsequent data communications from the source as authorized communications to be routed to their intended destinations.

21. The non-transitory computer readable medium of claim 20, having further instructions for monitoring a session corresponding to the source of the data communication and communicating session data to the payment service if the verification response indicates that the payment information is verified.

22. A device for routing data communications between multiple computing client devices and the internet comprising:
 a router operable to receive a routable data communication from multiple computing client devices and to route the data communication to an intended destination; and
 a limiter operable to:
  identify a communication type for the routable data communication within the limiter before the routable data communication is routed, the identifiable communication types including at least an owner communication type, an authorized communication type, and an anonymous communication type, wherein the identified communication type is an anonymous communication type;
  identify access rules for the identified communication type; and
  limit the routing of the data communication by the router according to the identified access rules, wherein the routing of the data communication is limited by allowing the data communication to be routed if the identified access rules indicate that anonymous communications are allowed, and preventing the data communication from being routed and causing access data to be communicated to the source of the data communication if the identified access rules indicate that anonymous communications are not allowed
 wherein the device is configured to enable simultaneous cellular data wireless connections between the multiple computing client devices and the internet.

23. The device of claim 22, wherein the limiter is operable to determine if routing the data communication to its intended destination will contravene the access rules and route the data communication to its intended destination only if it is determined that the access rules will not be contravened.

24. The device of claim 22, wherein the limiter is operable to obtain configuration data and identify access by parsing the configuration data to identify the access rules for the identified communication type.

25. The device of claim 24, wherein the device connects to the internet via a data exchanger and wherein the limiter is operable to obtain the configuration data from a service provider for the data exchanger.

26. The device of claim 25, wherein: the data exchanger is a data capable cellular device; the device comprises a connector operable to cause the data exchanger to establish a data connection with the service provider; and the limiter is operable to obtain the configuration data from the service provider via the data connection.

27. The device of claim 25, wherein the data exchanger is incorporated within the device.

28. The device of claim 22, wherein the limiter is operable to cause access data to be communicated by causing a user interface for entering payment information to be communicated to the source, the payment information to be communicated to a payment service.

29. The device of claim 28, wherein the limiter is operable to receive a verification response from the payment service and, if the verification response verifies the payment information, to identify subsequent data communications from the source as authorized communications to be routed to their intended destinations.

30. The device of claim 29, wherein the limiter is operable to monitor a session corresponding to the source of the data communication and communicate session data to the payment service if the verification response indicates that the payment information is verified.

31. The device of claim 22, further comprising a data exchanger, the data exchanger comprising a data capable cellular device, and wherein the device for routing communications is configured to allow wireless connection to the internet through the data exchanger.

32. The device of claim 31, wherein the data exchanger is incorporated within the networking device.

33. A method for limiting network communications, comprising:
 receiving a first routable data communication;
 identifying a communication type for the first routable data communication, the identifiable communication types including at least an owner communication type, an authorized communication type, and an anonymous communication type, wherein the identified communication type is an anonymous communication type;
 identifying access rules for the identified communication type; and
 limiting the routing of the first routable data communication according to the identified access rules, wherein the limiting the routing of the data communication includes allowing the data communication to be routed if the identified access rules indicate that anonymous communications are allowed; and preventing the data communication from being routed and causing access data to be communicated to the source of the data communication if the identified access rules indicate that anonymous communications are not allowed;
 wherein the method is implemented in a networking device through which data communications are routed between multiple computing client devices and an external cellular data network to enable simultaneous data communication between the multiple computing client devices and the external cellular data network; and
 wherein access to the external cellular data network from the networking device is provided wirelessly by a data capable cellular phone.

34. The method of claim 33, wherein the identified communication type for the first routable data communication is of the anonymous communication type and further comprising allowing the anonymous communication.

35. The method of claim 33, further comprising allowing network communication between a first computing client device and the external cellular data network through the networking device.

36. The method of claim 35, wherein the access rules comprise an access duration limit, a simultaneous sessions limit, a simultaneous users limit, a bandwidth limit, a bandwidth rate limit, or a data transfer limit.

37. The method of claim 36, wherein the first routable data communication is from the first computing client device and is routed to the external cellular data network, and further comprising receiving a second routable data communication, the second routable data communication being from the external cellular data network, and limiting the routing of the second routable data communication.

38. The method of claim 36, wherein the communication type of the first routable data communication is the authorized communication type, and further comprising receiving a third routable data communication from a second computing client device, identifying a communication type for the third routable data communication, the communication type being of the owner communication type, and limiting the routing of the second routable data communication according to the identified access rules for the owner communication type, wherein the access rules for the authorized communication type are different than the access rules for the owner communication type.

39. The method of claim 33, further comprising changing the access rules for the identified communication type.

40. The method of claim 39, wherein the access rules are changed by a communication of the owner communication type.

41. The method of claim 39, wherein access to the external cellular data network is provided to the networking device by a service provider and wherein the access rules are changed by the service provider.

* * * * *